United States Patent
Chickanosky et al.

(10) Patent No.: US 6,934,103 B2
(45) Date of Patent: Aug. 23, 2005

(54) READ CHANNEL WITH AUTOMATIC SERVO TRACK WRITER

(75) Inventors: Valerie Chickanosky, South Burlington, VT (US); Frank R. Keyser, III, Colchester, VT (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 280 days.

(21) Appl. No.: 10/293,370

(22) Filed: Nov. 12, 2002

(65) Prior Publication Data

US 2004/0090695 A1 May 13, 2004

(51) Int. Cl.⁷ ................................................. G11B 5/09
(52) U.S. Cl. ............................ 360/51; 360/75; 360/31
(58) Field of Search ........................... 360/75, 51, 31, 360/78.14, 78.11, 77.03, 77.08

(56) References Cited

U.S. PATENT DOCUMENTS

| | | | |
|---|---|---|---|
| 5,448,429 A | * | 9/1995 | Cribbs et al. ................. 360/75 |
| 5,612,834 A | | 3/1997 | Strang, Jr. |
| 6,075,668 A | * | 6/2000 | Chainer et al. ............... 360/51 |
| 6,204,984 B1 | | 3/2001 | Uno et al. |
| 6,278,568 B1 | | 8/2001 | Cloke et al. |
| 6,600,620 B1 | * | 7/2003 | Krounbi et al. ............... 360/75 |
| 2001/0010603 A1 | | 8/2001 | Uzumaki et al. |

* cited by examiner

Primary Examiner—Alan T. Faber
(74) Attorney, Agent, or Firm—Schmeiser, Olson & Watts; Douglas Millette

(57) ABSTRACT

A read channel for a hard disk controller comprising: means for generating a sequence of start of write signals to individually control the start of writing of each of one or more servo sync words to a disk; and means for individually writing the one or more servo sync words to the disk.

23 Claims, 7 Drawing Sheets

READ CHANNEL WITH AUTOMATIC SERVO TRACK WRITER

FIELD OF THE INVENTION

The present invention relates to the field of hard disk drives; more specifically, it to a read channel of a hard disk drive that automatically writes servo-data track segments.

BACKGROUND OF THE INVENTION

A large market exists for magnetic hard disk drives for mass-market host computer systems such as servers, desktop computers and laptop computers. To be competitive in this market, a hard disk drive must be relatively inexpensive and must accordingly embody a design that is adapted for low cost mass production.

A significant cost adder to hard disk drives is the need to write servo-data-track segments on the tracks of the disk before user-data may be written to the disk. Servo-data track segments allow the hard disk drive to determine where the read/write head of the disk drive is relative to the disk surface. Servo-track segments are written to hard-drive disks in clean rooms by servo-track-writers. A clean room is necessary to prevent foreign material falling on the disk surface. At the extremely high speeds that the disk spins at and given the extremely small distance between the surface of the magnetic disk and the read/write head of the hard-disk drive, very small amounts of foreign material can lead to hard disk drive failure. Additionally, servo track writers are expensive pieces of equipment.

Given the competitive market, any technique that will reduce the cost of manufacturing hard-disk drives and especially reduce the cost of writing servo-data would provide an important competitive advantage.

SUMMARY OF THE INVENTION

A first aspect of the present invention is a read channel for a hard disk controller comprising: means for generating a sequence of start of write signals to individually control the start of writing of each of one or more servo sync words to a disk; and means for individually writing the one or more servo sync words to the disk.

A second aspect of the present invention is a hard disk drive comprising: a disk assembly including a disk; and an electronics assembly comprising: a read channel comprising: means for generating a sequence of start of write signals to individually control the start of writing of each of one or more servo sync words to the disk; means for individually writing the one or more servo sync words to the disk; and a hard disk controller.

A third aspect of the present invention is a method of writing servo sync words to a disk of a hard disk drive comprising: generating a sequence of start of write signals in a read channel, the write signals individually controlling the start of writing of each of one or more servo sync words to the disk; and writing individually each the one or more servo sync words to the disk.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
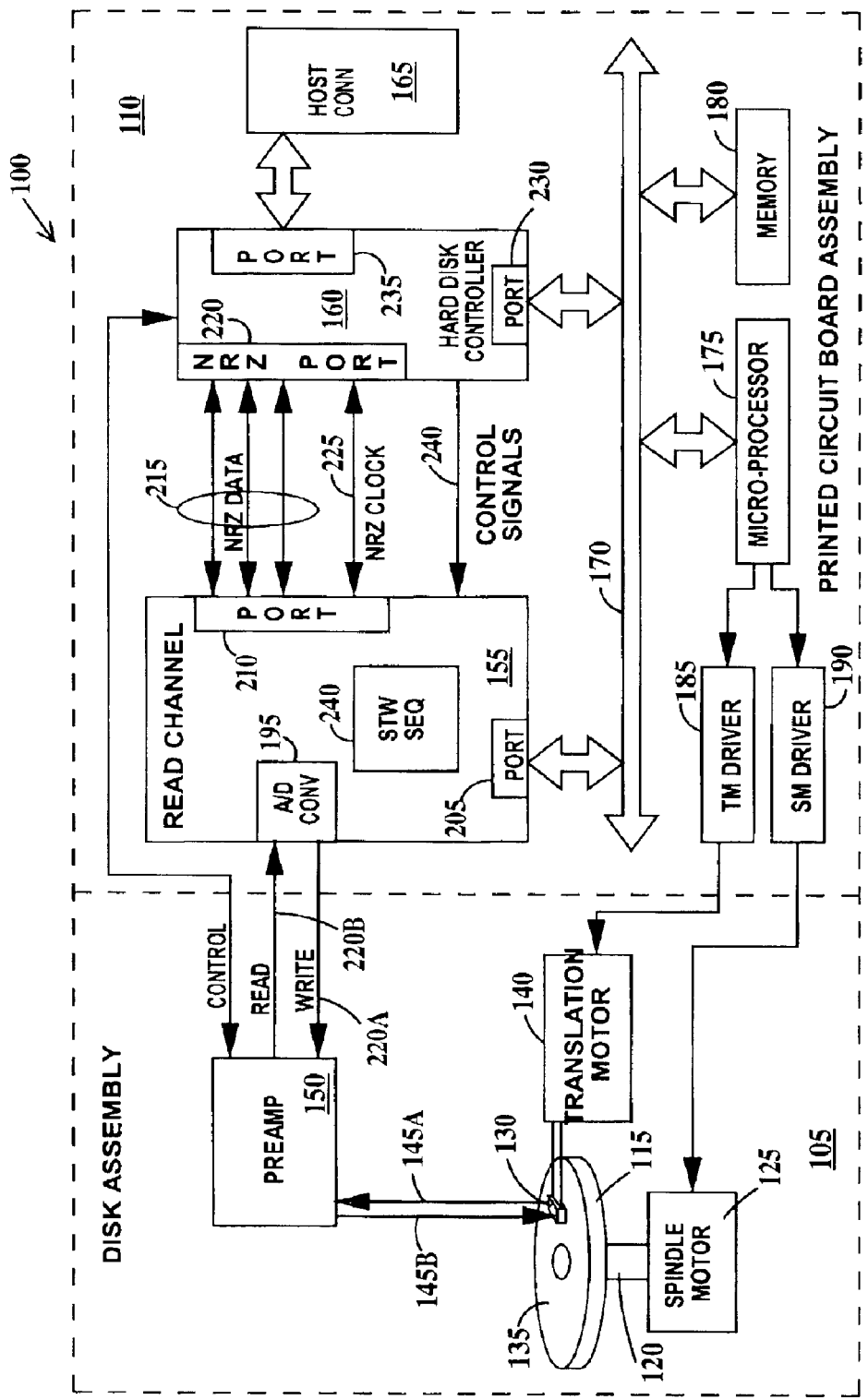
FIG. 1 is an overall functional block diagram of a hard disk drive according to the present invention.

FIG. 1 is an overall functional block diagram of hard disk drive 100 according to the present invention. In FIG. 1, hard disk drive 100 includes a disk assembly 105 and a printed circuit board assembly 110. Printed circuit board assembly 110 includes electronics necessary to support read and write operations of disk assembly 105.

Disk assembly 105 includes a magnetic disk 115 mounted on a spindle 120 rotatable by a spindle motor 125. A read/write pickup assembly 130 is suspended over a top surface 135 of magnetic disk 115. Read/write pickup assembly 130 is moved over top surface 135 of magnetic disk 115 by a translation motor 140. Read/write pickup assembly 130 generates read signals 145A received by a pre-amplifier 150 or receives a write signal 145B from pre-amplifier 150.

Printed circuit board assembly 110 includes a read channel 155, a hard disk controller 160, a host connector 165, a bus 170, a microprocessor 175, a memory unit 180, a translation motor driver 185 and a spindle motor driver 190. Microprocessor 170 and memory 180 are coupled to bus 170. Microprocessor 175 is also coupled to translation motor driver 185 and to spindle motor driver 190. Translation motor driver 185 and a spindle motor driver 190 drive translation motor 140 and spindle motor 125 respectively.

Read channel 155 provides the interface between printed circuit board assembly 110 and pre-amplifier 150 for both read and write operations. An analog to digital (A/D) converter 195 within read channel 155, receives READ signals 220B from pre-amplifier 150 and sends WRITE signals 200A to the pre-amplifier. Read channel 155 is coupled to bus 170 via a port 205. Read channel 155 has a port 210 connected via a bus 215 to a non-return-to-zero (NRZ) port 220 in hard disk controller 160. The terms "NRZ" refers to a coding system in which a binary 1 is represented (at a instant of time indicated by an NRZ clock signal 225) by a first level or state and a binary 0 is represented (at a instant in time indicated by NRZ clock signal 225) by a second level or state. Hard disk controller 160 is connected to bus 170 via port 230 and to host connector 165 via port 235. Hard disk controller 160 includes circuits for producing certain timing and control signals identified collectively as control signals 240 which are sent between the hard disk controller and read channel 155 as described infra.

Figure 5:
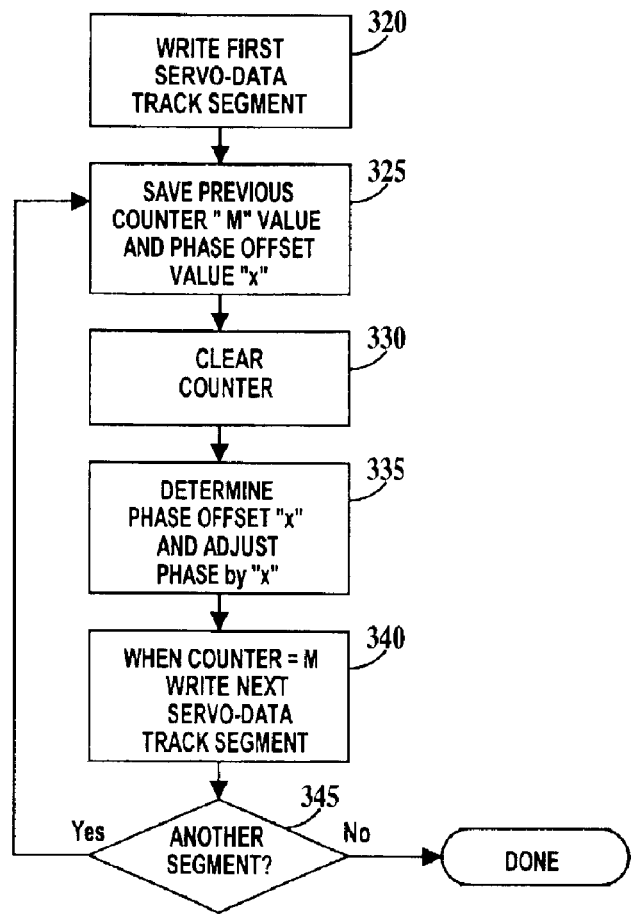
FIG. 5 is an overall flow chart of the operation writing servo-data of according to the present invention.

User-data is read and written and servo-data is read by read channel 155 as is well known in the art. However, read channel 155 includes a servo track write (STW) sequencer 240 which creates timing and control data that hard disk controller 160 will use to create servo-data and direct its write location as well. While user-data is written and user-data and servo-data are read as the need arises, servo-data is only written once, and before any user-data is written. Read channel 155 is illustrated in FIG. 5 and described infra. Both user-data and servo-data are supplied from a host computer through hard disk controller 160 delivered via bus 215.

Figure 2:
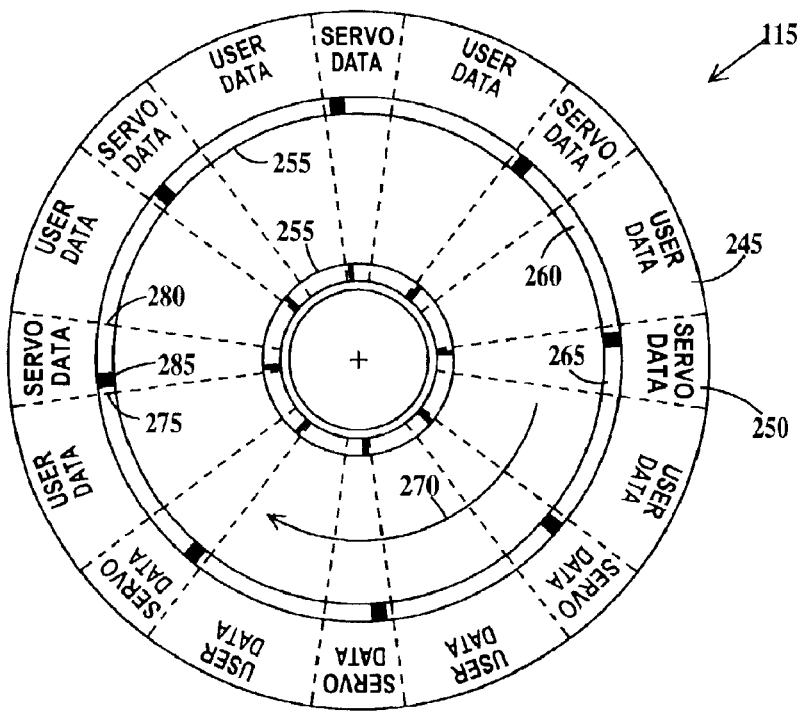
FIG. 2 is a drawing of a disk surface illustrating the relationship between various regions and tracks of a disk according to the present invention.

FIG. 2 is a drawing of a disk surface illustrating the relationship between various regions and tracks era disk according to the present invention. In FIG. 2, magnetic disk 115 includes a multiplicity of radially disposed interleaved user-data regions 243 and servo-data regions 250. Magnetic disk 115 is also divided into a multiplicity of concentric tracks 255, of which two are illustrated in FIG. 2. User-data regions 245 and servo-data regions 250 divide tracks 255 into track segments. Thus, any given track 253 includes a multiplicity of user-data track segments 260 alternating with servo-data track segments 265. A direction of rotation 270 of magnetic disk 135 delines a leading edge 275 and a trailing edge 280 of each servo-data track segment 265. A sync mark 285 is placed in proximity to each leading edge 275. All the servo-data contained within each servo-data track segment is written by hard disk drive 100 (see FIG. 1).

Figure 3:
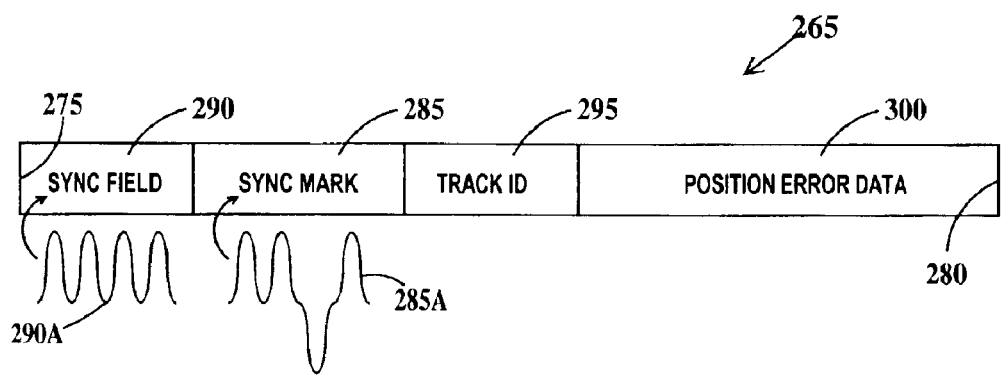
FIG. 3 is diagram of one servo-data track segment having a format in accordance to the present invention.

FIG. 3 is diagram of one servo-data track segment 265 having a format in accordance to the present invention. In FIG. 3, servo-data track segment includes in order from leading edge 275 to trailing edge 280 a sync field 290, sync mark 285, a track identification data field 295 and a position error data field 300. Sync field 290 produces a signal 290A having a fixed frequency that will be compared to the frequency of a clock within read channel 155 (see FIG. 1). Sync mark 285 produces a signal 285A that can be detected by STW sequencer 240 and used to determine the time/distance between sync marks. Position error data field 300 is used to correct the write location of subsequently written servo-data track segments 265. The data in sync field 290, sync mark 285, track identification data field 295 and position error data field 300 are defined as a servo sync word.

Figure 4:
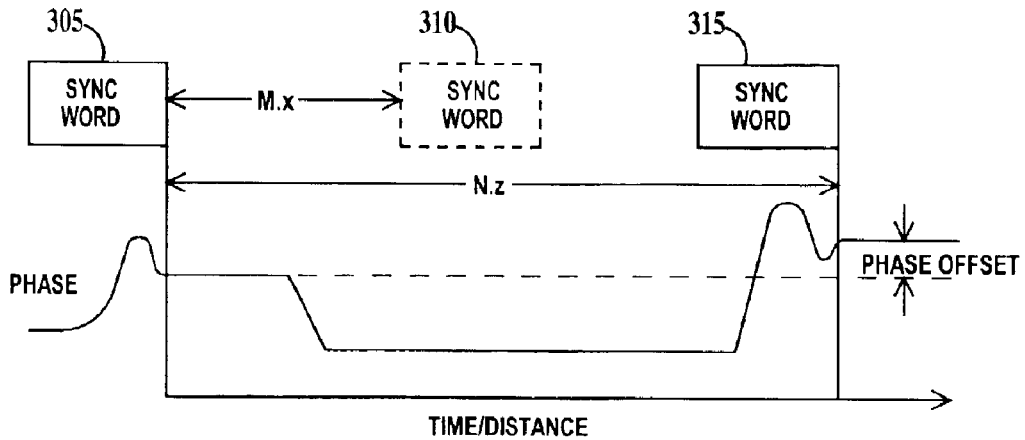
FIG. 4 is a diagram illustrating the timing of reading and writing of servo-data according to the present invention.

FIG. 4 is a diagram illustrating the timing of reading and writing of servo-data according to the present invention. In FIG. 4, the distance between a first already written servo sync word 305 and a yet unwritten servo sync word 310 (expressed as bit time) is "M.x" bits, where "M" is a selectable whole integer of read channel clock cycles and "x" is obtained by shifting the phase of the oscillator (oscillator 315 of FIG. 7) generating the read channel clock by the phase offset between the system clock signal and the signal 290A obtained from reading sync field 290 of servo sync word 305 until the read channel clock and signal 290A match. Note the value of "M" will vary from track to track as track segments become longer the further the track containing the track segments is from the center of the magnetic disk. After calculating "x" servo sync word 310 may be written. Further, tho distance between a first already written servo sync word (i.e. servo sync word 305) and a second already written servo sync word (i.e. servo sync word 315) expressed as bit time is "N.z" bits, where "N" is a measured whole integer of system clocks and "z" is the phase offset between the frequency of signals 290A obtained from reading the sync fields 290 of each servo sync word 305 and 315. This measurement is incorporated into the writing of the next servo sync word to correct for errors in actual placement of servo sync words that may occur.

The PHASE curve portion of FIG. 4 illustrates how the phase of servo sync word 305 may differ from the phase of servo sync word 315.

In a multi-sync option, channel 110 (see FIG. 1) will write two sync mark fields 285 (see FIG. 3), one for the servo sync word being written and one for the next servo sync word to be written, and one complete servo word on every servo sync word detect cycle.

FIG. 5 is an overall flow chart of the operation writing servo-data of according to the present invention. In step 320, the very first servo-data track segment is written on a completely blank magnetic disk. In step 325, the previous counter value of "M" and the previous phase offset "x" is saved (to be used for determining write location errors as described supra). In step 330, the counter is cleared and in step 335 the phase offset "x" is determined and the phase of a STW oscillator 315 (see FIG. 6) is adjusted. In step, 340, after the counter counts "M" clock cycles the next servo-data track segment is written. In step 345 is determined if another servo-data track segment is to be written. If another servo-data track segment is to be written then the process loops to step 325, otherwise the operation of writing servo data is done.

Figure 6:
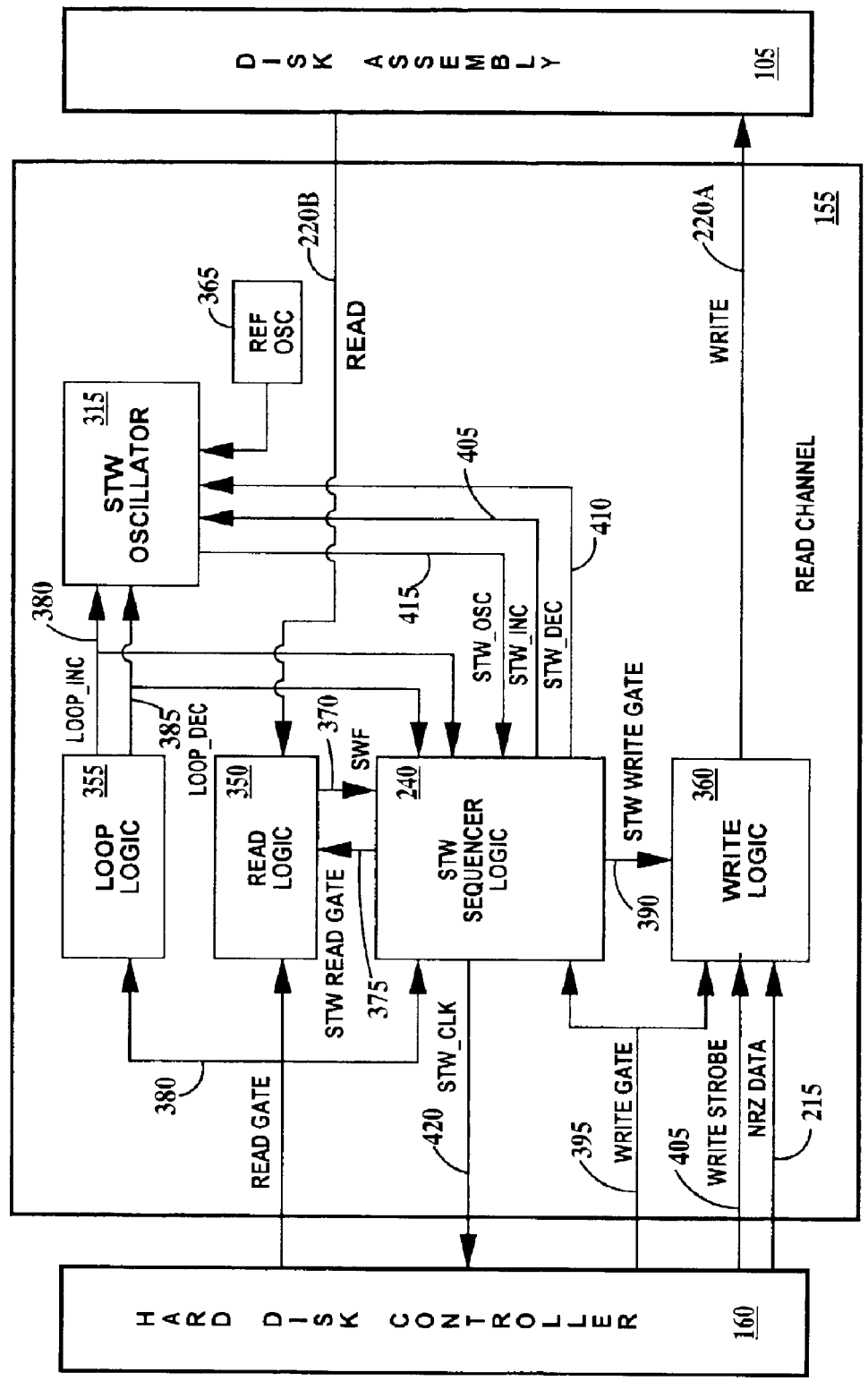
FIG. 6 is a system diagram of the present invention.
Figure 7:
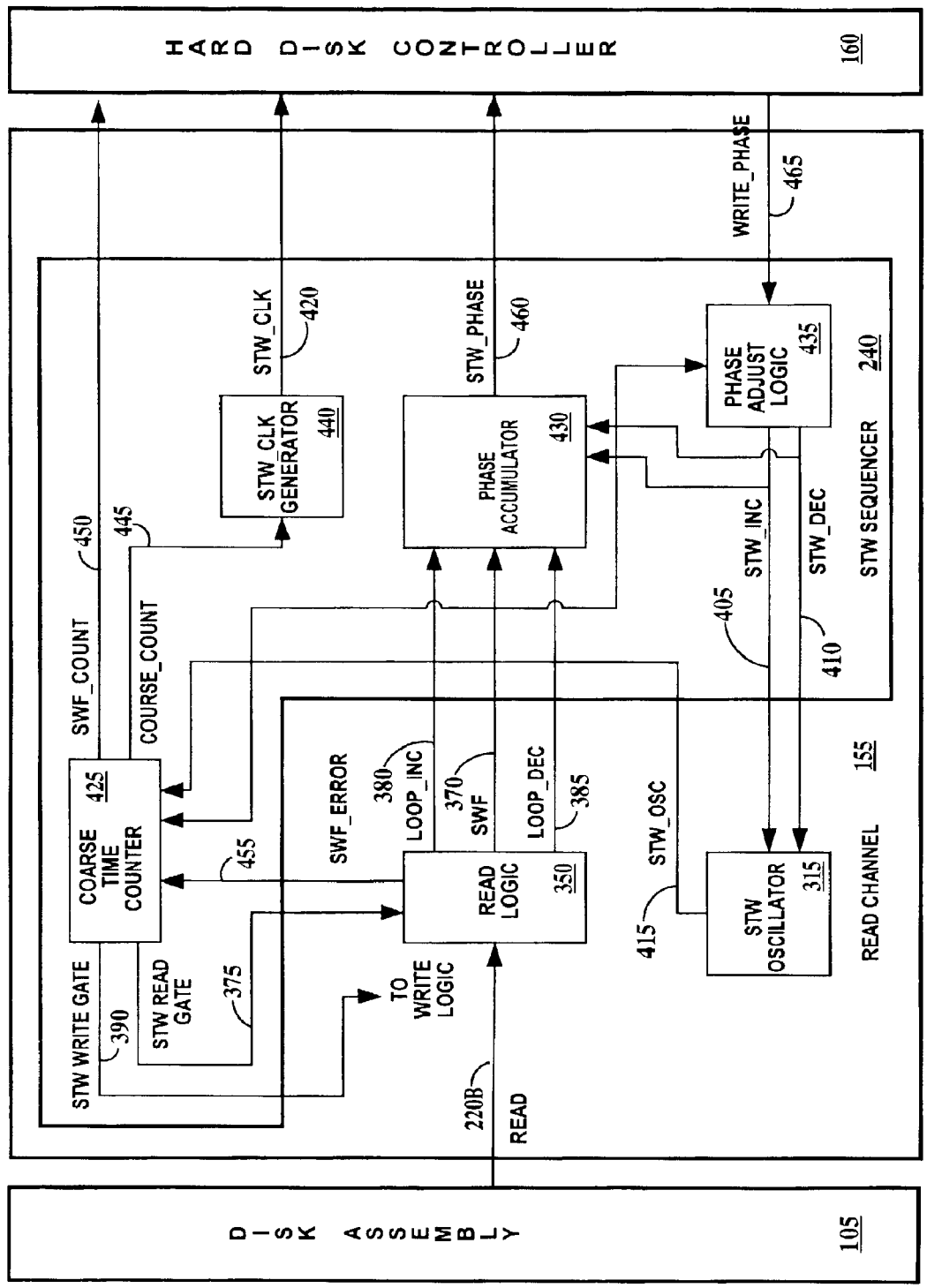
FIG. 7 is a schematic block diagram of a STW sequencer according to the present invention.

FIG. 6 is a system diagram of the present invention. In FIG. 6, read channel 155 includes STW sequencer 240, STW oscillator 315, a read logic 350, a loop logic 355, a write logic 360, and a reference oscillator 365. STW sequencer 240 sequences the control signals for the read, phase adjust and write sequences required for reading, positioning and writing servo-data track segment data, including generation of read and write gates independently of hard disk controller 160. The structure and operation of STW sequencer 240 is illustrated in FIG. 7 and more fully discussed infra.

Read logic 350 passes a servo sync word found (SWF) signal 370 to STW sequencer 240 and can receive a STW READ GATE signal 375 from the STW sequencer in addition to a normal READ GATE signal 380 from hard disk controller 160. READ GATE signal 380 enables read logic 350 to receive user-data via READ signal 220B from user-data track segments 260 of magnetic disk 115 (see FIG. 2) of disk assembly 105. STW READ GATE signal 375 enables read logic 350 to receive servo data via READ signal 220B.

Loop logic 355 operates similarly to the loop logic found in conventional read channels. However, loop logic 355 additionally passes phase corrections in the form of a LOOP_INC (increment) signal 380 and a LOOP_DEC (decrement) signal 385 to STW sequencer 240. Loop logic 355 also receives READ GATE signal 380 from hard disk controller 160.

Write logic 360 receives a STW WRITE GATE signal 390 from STW sequencer 240 in addition to the normal WRITE GATE signal 395 from hard disk controller 160. STW READ GATE signal 375 enables read of servo-data track segments during servo-data track segment write operations and STW WRITE GATE signal 390 enables write of servo-data track segments. Both user-data and servo-data is received from hard disk controller 160 via NRZ DATA signal 215 and the user-data and servo-data is serially stored in response to a WRITE STROBE signal 405. Write logic 360 writes to hard disk assembly 105 via WRITE signal 220A.

The frequency of STW oscillator 315 is locked to the frequency of reference oscillator 365, however the STW oscillator is phase adjustable. STW oscillator 315 employs a delayed lock loop circuit and a mixer circuit to make the phase adjustment in response to a STW_INC signal 405 and a STW_DEC signal 410 from STW sequencer 240 during servo sync word write and in response to LOOP_INC signal 380 and LOOP_DEC signal 385 during servo sync word read. STW oscillator 315 also passes a STW_OSC signal 415 to STW sequencer 240. STW_OSC signal 415 is a reference oscillator signal adjusted to match the phase of the sync field of the current servo sync word. In one example the resolution of the phase adjustment is 1/96 of a bit time.

Finally STW sequencer 240 passes an STW_CLK signal 420 to hard disk controller 160 as described *infra*.

FIG. 7 is a schematic block diagram of STW sequencer 240 according to the present invention. STW sequencer 240 includes a course time counter 425, a phase accumulator 430, a phase adjust logic 435 and a STW_CLK generator 440.

Course time counter 425 receives STW_OSC2 signal 415 from STW oscillator 315 and SWF signal 370 from read logic 350. Course time counter 425 generates STW READ GATE signal 375 and STW WRITE GATE signal 390, a COURSE_COUNT signal 445 (which is essentially another STW WRITE GATE signal) and a SWF_COUNT signal 450. SWF_COUNT signal 450 is the measure of time between detection of successive servo sync words.

Course time counter 425 counts at the STW_OSC frequency and runs continually while read channel 155 (see FIG. 1) is in STW mode. Course time counter 425 begins counting from zero (in one example, in 2-bit time resolution) when SWF signal 370 is received and stops counting when the next SWF signal 370 is received (resetting a COURSE_COUNT register within course time counter 425 to zero again after generating STW READ GATE signal 375, STW WRITE GATE signal 390, SWF_COUNT signal 450 and COURSE_COUNT signal 445). COURSE_COUNT signal 445 (and STW WRITE GATE signal 390) is active when the count in COURSE_COUNT register is equal to the count in a WRITE_COUNT register. WRITE_COUNT register is written to by hard disk controller 160. In one example, course time counter 425 counts in 2-bit time resolution. This count is the "M" described supra in reference to FIG. 4. Course time counter 425 then compares the STW_OSC signal 415 to the reference oscillator 365 (see FIG. 6) frequency and derives a fractional resolution that combined with the current count triggers STW WRITE GATE signal 390. The fractional resolution is the "x" described supra in reference to FIG. 4. SWF_COUNT is the measure of time between successive servo sync words in course time counter 425 bit time resolution (i.e. 2-bit time) and is updated every time a servo sync word is found. In the event that a servo sync word is not found by read logic 350 (a maximum number of STW_OSC cycles is exceeded), a SWF_ERROR signal 455 is generated which starts a error recovery mode.

Phase accumulator 430 receives SWF signal 370, LOOP_INC signal 380, LOOP_DEC signal 385, STW_INC signal 405 and STW_DEC signal 410 and outputs a SWF_PHASE signal 460. SWF_PHASE signal 460 is the measure of the phase change between two successive servo sync words. It is updated every time a servo-sync word is found. SWF_PHASE signal 460 is sent to hard disk controller 160 so individual location errors (defined as physical disk location errors) in writing servo sync words can be determined and adjustments made in the location of the next servo sync word to be written. This adjustment (in terms of a phase shift to STW_OSC signal 415) in the location to write the next servo sync word is passed by hard disk controller 160 via a WRITE_PHASE signal 465. Phase accumulator 430 accumulates all the phase changes between servo sync words by counting all the LOOP_INC signal 380, LOOP_DEC signal 385, STW_INC signal 405 and STW_DEC signal 410 pulses. Phase accumulator also accounts for "phase rollover." For example, in 1/96 bit time resolution 5/96 of a bit time and 101/96 of a bit time resolution differ by one full STW_OSC signal 415 cycle. In both cases STW_PHASE signal 460 carries a value of 5/96 of a bit time.

Phase adjust logic 435 receives WRITE_PHASE signal 465 from hard disk controller 160 and generates STW_INC signal 405 or STW_DEC signal 410 as appropriate (and at appropriate values) and passes STW_INC 405 and STW_DEC signal 410 to STW oscillator 315.

STW_CLK generator 440 receives COURSE_COUNT signal 445 and sends STW_CLK signal 420 to hard disk controller 160 when COURSE_COUNT signal 445 is active. STW_CLK signal 420 is used by hard disk controller 160 to transfer servo-data over bus 215 (see FIGS. 1 and 6).

Figure 8:
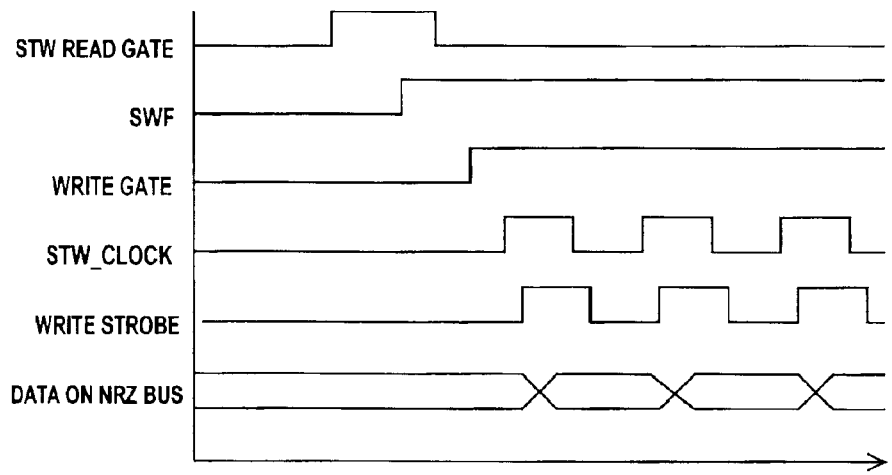
FIG. 8 is a timing diagram of the major control and timing signals for the STW sequencer of FIG. 7.

FIG. 8 is a timing diagram of the major control and timing signals for STW sequencer 240. In FIG. 8, STW READ GATE is asserted and when a servo sync word is found SWF turns on. The hard disk controller generates a new servo sync word position data for the new servo sync word, accounting for the delay between SWF active and WRITE GATE active. When WRITE GATE is active STW_CLK turns on, then WRITE STROBE turns on. Servo-data is then written from the NRZ bus based on WRITE STROBE timing.

Figure 9:
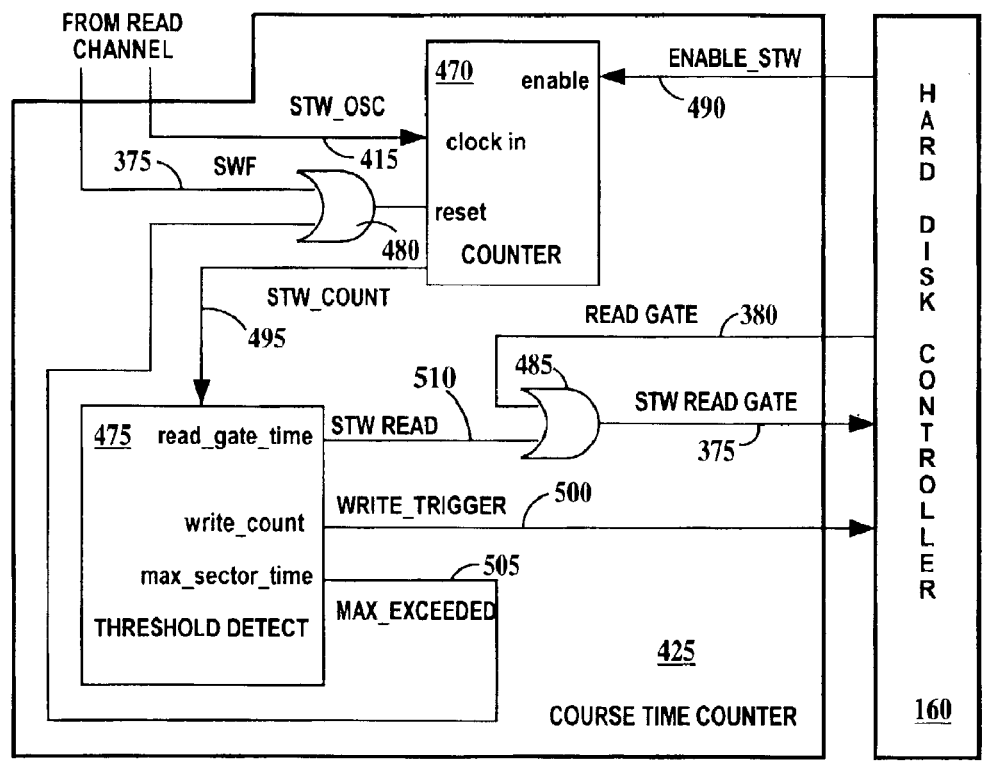
FIG. 9 is a schematic block diagram of a course time counter.

FIG. 9 is a schematic block diagram of course time counter 425. On bring up of hard disk drive 100 (see FIG. 1) for the very first time, there is no "previous" servo sync word to detect so signal SWF 370 (see FIG. 7) would normally not go active. This is taken into account by the circuits within course time counter 425 as described infra. Course time counter provides automatic read gate generation and programmable write triggering.

In FIG. 9, course time counter 425 includes a counter 470, a threshold detector 475, an OR gate 480 and an OR gate 485. Course time counter 425 receives STW_OSC signal 415 and SWF signal 375 (if a previous servo sync word was found) from read channel 155 (see FIG. 7). STW_OSC signal 415 is coupled to a clock ininput of counter 470 and SWF signal 375 is coupled to a first input of OR gate 480. The output of OR gate 480 is coupled to a reset input of counter 470. Counter 470 also receives an ENABLE STW signal 490 from hard disk controller 160. When ENABLE STW is asserted, counter 470 is enabled. Counter 470 generates an STW_COUNT signal 495 received by threshold detector 475. STW_COUNT signal 495 is the number of STW_OSC cycles since the last reset.

Threshold detector 475 will send a WRITE_TRIGGER signal 500 to hard disk controller 160 to begin writing servo sync word data at the programmable location write_count. If no STW_COUNT signal 495 is received within a programmable Max_Sector_Time (for example, the very first time the disk is written to or if a servo sync word is missed) a MAX_EXCEEDED signal 505 is generated by threshold detector 475 and coupled to a second input of OR gate 480 and trigger a reset. A servo sync word will be generated at a programmable location max_sector_count.

Threshold detector 475 also generates a STW READ signal 510. STW READ signal 510 is coupled to a first input of OR gate 485. READ GATE signal 380 from hard disk controller 160 is coupled to a second input of OR gate 485. The output of OR gate 485 (STW READ GATE signal 375) is coupled to hard disk controller 160. This causes a read of a servo sync word at the write_count location (or the max_sector_count location).

Figure 10:
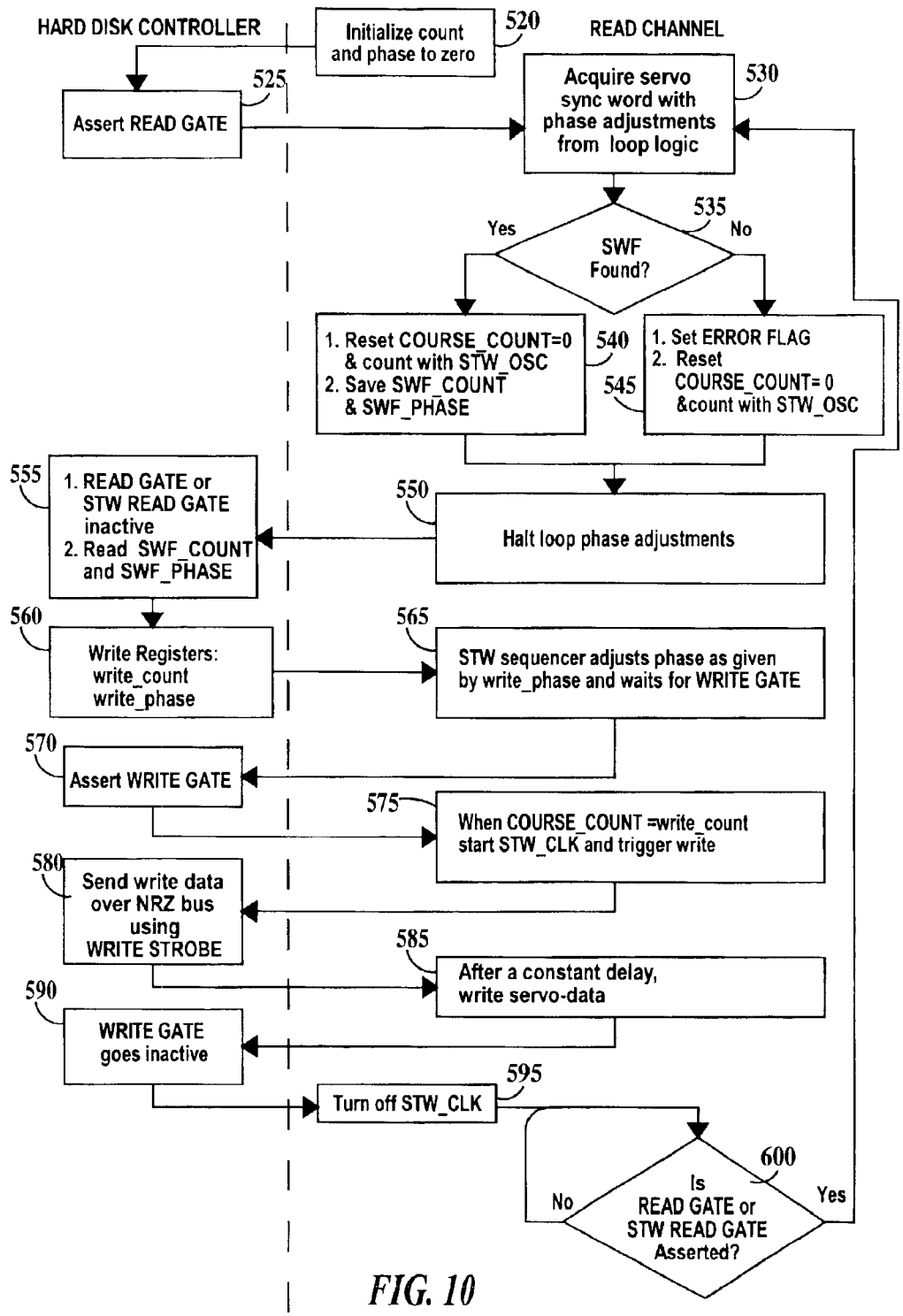
FIG. 10 is a detailed flow chart of the operation of the present invention.

FIG. 10 is a detailed flow chart of the operation of the present invention. In FIG. 10, the steps to the left of the dashed line are performed by hard disk controller 160 (see FIG. 1) and steps to the right of the dashed line are performed by read channel 155 (see FIG. 1). Step 520 occurs in response to STW MODE enabled.

In step 520, all counters and phase adjustments are set to zero. In step 525, READ GATE is asserted and in step 530, an attempt is made to acquire a servo sync word using loop logic phase adjustments (LOOP_INC and LOOP_DEC). In step 535, it is determined if an SWF was found. If an SWF was found then in step 540, COURSE_COUNT is set to zero and counting will be at STW_OSC cycles and SWF_COUNT and SWF_PHASE are saved (N.z). If an SWF was not found in step 535 then in step 545, an ERROR FLAG is set and COURSE_COUNT is set to 0. After either step 540 or 545, step 550 is performed. In step 550, all loop phase adjustments are halted ((LOOP_INC and LOOP_DEC). Next in step 555, STW READ GATE goes inactive, and SWF_COUNT and SWF_PHASE (M.x) are read. In step 560, SWF_COUNT and SWF_PHASE are optionally written into registers write_count and write_phase respectively. In step 565, the STW sequencer adjusts the phase of STW_OSC and waits for WRITE GATE to be asserted. In step 570 the WRITE GATE is asserted. In step 575, when COURSE_COUNT=write_count, STW_CLK is started and writing of a servo sync word is triggered. In step 580, servo-data is sent over the NRZ bus using WRITE_STROBE timing. Next in step 585, after a fixed propargation delay, servo-data is written to disk. Next in step 590, WRITE GATE goes inactive and in step 595 STW_CLK is turned off. Step 600 waits for a READ GATE or STW a STW READ GATE to be asserted to loop back to step 530 to begin the process of writing another servo sync word. Step 600 remains active as long as STW MODE is asserted. Steps 520 through 600 are performed on a blank disk and performed only during the first bring-up of the hard drive.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A read channel for a hard disk controller comprising:
   means for generating servo sync word of a set of servo sync words, each servo sync word of said set of servo sync words comprising at least a sync field;
   means for writing a first servo sync word of said set of servo sync words to a blank disk;
   means for determining a write location on said disk of a next to be written servo sync word of said set of servo sync words based on data contained within a sync field of an existing servo sync word of said set of servo sync words; and
   means for individually writing each servo sync word of said set of servo sync words to a different determined write location on said disk.

2. The read channel of claim 1, wherein each said sync word of said set of sync words is separated by a blank user data region of said blank disk.

3. The read channel of claim 1, wherein said means for generating said set of servo sync words is a programmable means.

4. The read channel of claim 1, wherein a distance between a previous and a subsequent and immediately adjacent servo sync word of said set of servo sync words expressed in bit time is M.x, where M is a programmable number of clock cycles of a read channel clock and x is a whole number numerator of a fraction expressing a phase adjustment to an oscillator driving said read channel clock in order that the frequency of said read channel clock match a frequency encoded in a sync field of said previous adjacent servo sync word.

5. The read channel of claim 1, further including means for adjusting frequency of a read channel clock generator based on an offset between a frequency signal generated by a sync field of a latest written servo sync word of said set of servo sync words and a current frequency of said clock generator prior to writing of a next servo sync word of said set of servo sync words.

6. The read channel of claim 1, further including:
   means for generating a sequence of start of write signals to individually control the start of writing of each servo sync word of said set of servo sync words;
   means for generating a sequence of start of read signals to individually control the start reading of each servo sync word of said set of servo sync words from said disk; and
   means for reading said one or more servo sync words on said disk.

7. The read channel of claim 6, further including logic circuits for ensuring that writing of each servo sync word of said set of servo sync words is automatically preceded by reading of a prior servo sync word of said set of servo sync words.

8. The read channel of claim 1, wherein said servo sync word further includes a sync mark field, a track ID field and a position error data field.

9. A hard disk drive comprising:
   a disk assembly including a disk; and
   an electronics assembly comprising:
      a read channel comprising:
         means for generating servo sync word of a set of servo sync words, each servo sync word of said set of servo sync words comprising at least a sync field;
         means for writing a first servo sync word of said set of servo sync words to a blank disk;
         means for determining a write location on said disk of a next to be written servo sync word of said set of servo sync word based on data contained within a sync field of an existing servo sync word of servo sync words; and
         means for individually writing each servo sync word of said set of servo sync words to determine write locations on said disk; and a hard disk controller.

10. The hard disk drive of claim 9, wherein each said sync word of said set of sync words is separated by a blank user data region of said blank disk.

11. The hard disk drive of claim 9, wherein a distance between a previous and a subsequent and immediately adjacent servo sync word of said set of servo sync words expressed in bit time is M.x, where M is a programmable number of clock cycles of a read channel clock and x is a whole number numerator of a fraction expressing a phase adjustment to an oscillator driving said read channel clock in order that the frequency of said read channel clock match a frequency encoded in a sync field of said previous adjacent servo sync word.

12. The hard disk drive of claim 9, further includes means for adjusting frequency of a read channel clock generator based on an offset between a frequency signal generated by a sync field of a latest written servo sync word of said set of servo sync words and a current frequency of said clock generator prior to writing of a next servo sync word of said set of servo sync words.

13. The hard disk drive of claim 9, wherein said read channel further includes:

means for generating a sequence of start of write signals to individually control the start of writing of each servo sync word of said set of servo sync words;

means for generating a sequence of start of read signals to individually control the start of reading of each servo syncs words of said set of servo syncs words from said disk; and means for reading said one or more servo sync words on said disk.

14. The hard disk drive of claim 9, wherein said servo sync word further includes a sync mark field, a track ID field and a position error data field.

15. A hard disk drive, comprising:

a disk assembly including a disk; and an electronics assembly comprising:

a read channel comprising:

means for generating a sequence of start of write signals to individually control the start of writing of each one of said one or more servo sync words to said disk;

means for individually writing said one or more servo sync words to said disk;

means for generating a sequence of start read signals to individually control the start of reading of each said one or more servo sync words from said disk;

means for reading said one or more servo sync words on said disk;

wherein said means for generating a sequence of start of write signals and said means for generating a sequence of start of read signals includes:

an adjustable phase oscillator for generating a clocking signal;

read logic adapted to read said servo sync words and responsive to either said start of read signals or responsive to external start of read signals generated by said hard disk controller;

write logic adapted to write said servo sync words and responsive to either said start of write signals or responsive to external start of write signals generated by said hard disk controller;

sequencer logic adapted to shift the phase of said clocking signal during servo sync word write cycles in response to a phase shift request from said hard disk controller; and loop logic adapted to shift the phase of said clocking signal to match the phase of a sync clock signal generated from said servo sync words during servo sync word read cycles; and a hard disk controller.

16. The hard disk drive of claim 15, wherein said sequence logic includes a clock generator for generating a transfer clock signal for clocking servo-data from said hard disk controller to said write logic.

17. A method of writing servo sync words to a disk of a hard disk drive, comprising:

generating each servo sync word of a set of servo sync words, each servo sync word of said set of servo sync words comprising at least a sync field;

writing a first servo sync word of said set of servo sync words to a blank disk;

determining a write location on said disk of a next to be written servo sync word of said set of servo sync words based on a frequency of a signal generated by reading a sync field of a previously written servo sync word of said set of servo sync words; and individually writing each servo sync word of said set of servo to determined write locations on said disk.

18. The method of claim 17, wherein said sync word of said set of sync words is separated by a blank user data region of said blank disk, said blank user data region being blank or erased previous to writing said first servo sync word.

19. The method of claim 17, wherein a distance between a previous and a subsequent and immediately adjacent servo sync word of said set of servo sync words expressed in bit time is M.x, where M is a programmable number of clock cycles of a read channel clock and x is a whole number numerator of a fraction expressing a phase adjustment to an oscillator driving said read channel clock in order that the frequency of said read channel clock match a frequency encoded in a sync field of said previous adjacent servo sync word.

20. The method of claim 17, further including:

adjusting a frequency of a read channel clock generator based on an offset between a frequency signal generated by a sync field of a latest written servo sync word of said set of servo sync words and a current frequency of said read channel clock generator prior to writing of a next servo sync word of said set of servo sync words.

21. The method of claim 17, further including:

generating a sequence of start of write signals to individually control the start of writing of each servo sync word of said set of servo sync words;

generating a sequence of start of read signals to individually control the start of reading of each servo sync word of said set of servo sync words from said disk; and reading said one or more servo sync words on said disk.

22. The method of claim 21, further including:

preceding writing of each to be written servo sync word of said set of servo sync words by automatically reading an immediately previously written servo sync word of said set of servo sync words.

23. The read channel of claim 17, wherein said servo sync word further includes a sync mark field, a track ID field and a position error data field.

* * * * *

UNITED STATES PATENT AND TRADEMARK OFFICE
CERTIFICATE OF CORRECTION

PATENT NO. : 6,934,103 B2
DATED : August 23, 2005
INVENTOR(S) : Chickanosky et al.

It is certified that error appears in the above-identified patent and that said Letters Patent is hereby corrected as shown below:

Column 8,
Line 31, delete "a prior" and insert -- an existing --.
Line 41, delete "generating servo" and insert -- generating each servo --.
Line 49, delete "word" and insert -- words --.
Line 50, delete "of servo" and insert -- of said set of servo --.

Column 9,
Line 15, delete "syncs words of said set of servo syncs words from" and insert -- sync word of said set of servo sync words --.

Column 10,
Line 18, delete "servo to" and insert -- servo sync words to --.
Line 19, delete "wherein said" and insert -- wherein each said --.

Signed and Sealed this

Eighth Day of November, 2005

JON W. DUDAS
*Director of the United States Patent and Trademark Office*